US012670558B2

(12) United States Patent
Cho

(10) Patent No.: US 12,670,558 B2
(45) Date of Patent: Jun. 30, 2026

(54) APPARATUS FOR EXTRACTING NOISE FROM IMAGE AND METHOD THEREOF

(71) Applicants: HYUNDAI MOTOR COMPANY, Seoul (KR); KIA CORPORATION, Seoul (KR)

(72) Inventor: Jae Hoon Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 301 days.

(21) Appl. No.: 18/367,845

(22) Filed: Sep. 13, 2023

(65) Prior Publication Data

US 2024/0311979 A1      Sep. 19, 2024

(30) Foreign Application Priority Data

Mar. 16, 2023    (KR) ........................ 10-2023-0034680

(51) Int. Cl.
  *G06T 5/70* (2024.01)
  *G06T 5/50* (2006.01)
(52) U.S. Cl.
  CPC ................. *G06T 5/70* (2024.01); *G06T 5/50* (2013.01); *G06T 2207/20084* (2013.01)
(58) Field of Classification Search
  CPC ... G06T 5/70; G06T 5/50; G06T 2207/20084; G06T 7/97; G06T 9/00; G06T 2207/20081; G06T 2207/20182
  See application file for complete search history.

(56) References Cited

U.S. PATENT DOCUMENTS

2023/0058096 A1* 2/2023 Ferrés ....................... G06T 7/40

FOREIGN PATENT DOCUMENTS

KR      102095444 B1     3/2020
KR      102296644 B1 *   9/2021 ............... G06T 5/20

OTHER PUBLICATIONS

J. Cho, S. Kim and K. Sohn, "Memory-Guided Image De-Raining Using Time-Lapse Data," in IEEE Transactions on Image Processing, vol. 31, pp. 4090-4103, 2022, doi: 10.1109/TIP.2022.3180561 (Year: 2022).*

(Continued)

*Primary Examiner* — Amandeep Saini
*Assistant Examiner* — Jaspreet Kaur
(74) *Attorney, Agent, or Firm* — Lempia Summerfield Katz LLC

(57)      ABSTRACT

An apparatus for extracting image noise includes an encoder that encodes a first image and a second image in a time-series image to output an encoding feature map. The apparatus also includes a noise information extraction layer that generates a first noise prototype vector to an M-th noise prototype vector of the first image and the second image, and outputs first noise information with reference to at least a part of the first noise prototype vector to the M-th noise prototype vector and the encoding feature map. The apparatus additionally includes a decoder that decodes the first noise information to output second noise information. The apparatus further includes a parameter updater that outputs a loss with reference to the first image, the second image, and the corresponding second noise information, and updates parameters of the encoder, the noise information extraction layer and/or the decoder through back propagation using the loss.

6 Claims, 5 Drawing Sheets

(56) References Cited

OTHER PUBLICATIONS

K. Jiang et al., "Decomposition Makes Better Rain Removal: An Improved Attention-Guided Deraining Network," in IEEE Transactions on Circuits and Systems for Video Technology, vol. 31, No. 10, pp. 3981-3995, Oct. 2021, doi: 10.1109/TCSVT.2020.3044887 (Year: 2021).*
KR 10-2296644 B1—Translation from IP.com (Year: 2021).*
Laurens Van Der Maaten, et al., Visualizing Data using t-SNE, Journal of Machine Learning Research 9 (2008), 27 pp.

* cited by examiner

<u>100</u>

ENCODER
<u>110</u>

NOISE INFORMATION
EXTRACTION LAYER
<u>120</u>

DECODER
<u>130</u>

PARAMETER UPDATER
<u>140</u>

APPARATUS FOR EXTRACTING NOISE FROM IMAGE AND METHOD THEREOF

CROSS-REFERENCE TO RELATED APPLICATION

This application claims the benefit of and priority to Korean Patent Application No. 10-2023-0034680, filed on Mar. 16, 2023, the entire contents of which are incorporated herein by reference.

TECHNICAL FIELD

The present disclosure relates generally to an apparatus for extracting image noise and a method thereof, and more particularly, to a learning apparatus and method for extracting noise included in an image based on a deep learning network.

BACKGROUND

A deep learning network is sometimes used to extract noise included in an image and remove the noise from the image. Schemes of training such deep learning network may be largely classified into supervised learning, semi-supervised learning, and unsupervised learning.

In the case of the supervised learning scheme, because it is difficult to construct learning data by using a real image taken of a real object, a synthetic image including noise in the real image is generated, and a deep learning network is trained using the synthetic image. For example, after generating a synthetic image by adding rain streak information as noise information to an image taken in a non-raining state, a deep learning network is trained using the synthetic image.

However, because the synthetic image is inevitably different from the actual image, the actual noise extraction performance of the deep learning network trained using the synthesized image may not be good.

Further, even in the case of the semi-supervised learning scheme, because it is difficult to construct learning data using a real image, a synthetic image is generated by adding noise to the real image and used for training a deep learning network. Accordingly, like the supervised learning scheme, noise extraction performance may not be good.

SUMMARY

The present disclosure has been made to solve the above-mentioned problems occurring in the prior art while advantages achieved by the prior art are maintained intact.

An aspect of the present disclosure provides a method of extracting noise included in an image based on a deep learning network.

Another aspect of the present disclosure provides a method of generating various types of noise information by analyzing features of each pixel of a feature map and effectively extracting noise included in an image using the noise information.

The technical problems to be solved by the present disclosure are not limited to the aforementioned problems, and other technical problems not mentioned herein should be clearly understood from the following description by those having ordinary skill in the art to which the present disclosure pertains.

According to an aspect of the present disclosure, an apparatus for extracting noise from an image includes an encoder configured to apply an encoding operation to a first image and a second image included in a time-series image to output an encoding feature map of each of the first image and the second image. The apparatus also includes a noise information extraction layer configured to apply a noise prototype vector generation operation to the encoding feature map to generate a first noise prototype vector to an M-th noise prototype vector of each of the first image and the second image, and output first noise information of each of the first image and the second image with reference to at least a part of the first noise prototype vector to the M-th noise prototype vector and the encoding feature map. The apparatus additionally includes a decoder configured to apply a decoding operation to the first noise information to output second noise information of each of the first image and the second image. The apparatus further includes a parameter updater configured to output a loss with reference to the first image, the second image, and the corresponding second noise information, and update parameters of at least some of the encoder, the noise information extraction layer and the decoder through back propagation using the loss.

In an embodiment, the noise information extraction layer may be configured to apply a first attention mapping operation to an M-th attention mapping operation to the encoding feature map to generate first attention mapping information to M-th attention mapping information of each of the first image and the second image. The noise information extraction layer may also be configured to generate the first noise prototype vector to the M-th noise prototype vector of each of the first image and the second image with reference to the encoding feature map and the first attention mapping information to the M-th attention mapping information. The noise information extraction layer may additionally be configured to generate an integrated noise vector with reference to the first noise prototype vector to the M-th noise prototype vector and vector similarities corresponding thereto, wherein the vector similarity corresponds to a similarity between each of the first noise prototype vector to the M-th noise prototype vector and the encoding feature map. The noise information extraction layer may further be configured to output the first noise information of each of the first image and the second image with reference to the encoding feature map and the integrated noise vector.

In an embodiment, the noise information extraction layer may be configured to apply the first attention mapping operation to the M-th attention mapping operation to an encoding vector for each pixel corresponding to a plurality of pixels of the encoding feature map to generate first noise attention mapping information to an M-th noise attention mapping information for each pixel corresponding to each encoding vector for each pixel of the first image and the second image. The noise information extraction layer may also be configured to generate the first noise prototype vector to the M-th noise prototype vector of each of the first image and the second image with reference to the encoding vector for each pixel and the first noise attention mapping information for each pixel to the M-th noise attention mapping information for each pixel. The noise information extraction layer may additionally be configured to generate an integrated noise vector for each pixel with reference to the first noise prototype vector to the M-th noise prototype vector and the vector similarity for each pixel corresponding thereto, wherein the vector similarity for each pixel corresponds to a similarity between each of the first noise prototype vector to the M-th noise prototype vector and the encoding vector for each pixel. The noise information extraction layer may further be configured to output the first noise information of each of the first image and the second image with reference to the integrated noise vector for each pixel and the encoding vector for each pixel.

In an embodiment, the noise information extraction layer may be configured to perform a channel-wise summation of the integrated noise vector for each pixel and the encoding vector for each pixel to output the first noise information.

In an embodiment, the loss may include a first loss and a second loss. The parameter updater may be configured to generate a first denoised image and a second denoised image by using the first image, the second image, and the second noise information corresponding thereto. The parameter updater may also be configured to output the first loss with reference to the first denoised image and the second denoised image. The parameter updater may additionally be configured to determine a specific noise prototype vector that satisfies a preset similarity condition among the first noise prototype vector to the M-th noise prototype vector with reference to the vector similarity for each pixel. The parameter updater may further be configured to output the second loss with reference to the encoding vector for each pixel and the specific noise prototype vector.

In an embodiment, the loss may further include a third loss, a fourth loss, and a fifth loss. The parameter updater may further be configured to output the third loss with reference to the first denoised image and the second image or to the second denoised image and the first image, output the fourth loss with reference to a specific denoised image corresponding to a specific image among the first image and the second image, specific noise information corresponding to the specific image, and the specific image, and output the fifth loss with reference to the first noise prototype vector to the M-th noise prototype vector.

According to another aspect of the present disclosure, an image noise extraction test apparatus includes an encoder configured to apply an encoding operation to a test image to output a test encoding feature map corresponding to the test image. The image noise extraction test apparatus also includes a noise information extraction layer configured to apply a noise prototype vector generation operation to the test encoding feature map to generate a first test noise prototype vector to an M-th test noise prototype vector corresponding to the test image, and output first test noise information corresponding to the test image with reference to at least a part of the first test noise prototype vector to the M-th test noise prototype vector and the test encoding feature map. The image noise extraction test apparatus additionally includes a decoder configured to applies a decoding operation to the first test noise information to output second test noise information corresponding to the test image, and an output device that outputs a test denoised image with reference to the test image and the second test noise information.

According to still another aspect of the present disclosure, a method of learning image noise extraction includes outputting an encoding feature map of each of a first image and a second image by applying an encoding operation to a first image and a second image included in a time-series image. The method also includes applying a noise prototype vector generation operation to the encoding feature map to generate a first noise prototype vector to an M-th noise prototype vector of each of the first image and the second image. The method additionally includes outputting first noise information of each of the first image and the second image with reference to at least a part of the first noise prototype vector to the M-th noise prototype vector and the encoding feature map. The method further includes outputting second noise information of each of the first image and the second image by applying a decoding operation to the first noise information. The method further still includes outputting a loss with reference to the first image, the second image, and the corresponding second noise information. The method also includes updating parameters of at least some of an encoder, a noise information extraction layer and a decoder through back propagation using the loss.

In an embodiment, outputting the first noise information may include applying a first attention mapping operation to an M-th attention mapping operation to the encoding feature map to generate first attention mapping information to M-th attention mapping information of each of the first image and the second image. Outputting the first noise information may also include generating the first noise prototype vector to the M-th noise prototype vector of each of the first image and the second image with reference to the encoding feature map and the first attention mapping information to the M-th attention mapping information. Outputting the first noise information may additionally include generating an integrated noise vector with reference to the first noise prototype vector to the M-th noise prototype vector and vector similarities corresponding thereto, wherein the vector similarity corresponds to a similarity between each of the first noise prototype vector to the M-th noise prototype vector and the encoding feature map. Outputting the first noise information may further include outputting the first noise information of each of the first image and the second image with reference to the encoding feature map and the integrated noise vector.

In an embodiment, outputting the first noise information may include applying the first attention mapping operation to the M-th attention mapping operation to an encoding vector for each pixel corresponding to a plurality of pixels of the encoding feature map to generate first noise attention mapping information to an M-th noise attention mapping information for each pixel corresponding to each encoding vector for each pixel of the first image and the second image. Outputting the first noise information may also include generating the first noise prototype vector to the M-th noise prototype vector of each of the first image and the second image with reference to the encoding vector for each pixel and the first noise attention mapping information for each pixel to the M-th noise attention mapping information for each pixel. Outputting the first noise information may additionally include generating an integrated noise vector for each pixel with reference to the first noise prototype vector to the M-th noise prototype vector and the vector similarity for each pixel corresponding thereto, wherein the vector similarity for each pixel corresponds to a similarity between each of the first noise prototype vector to the M-th noise prototype vector and the encoding vector for each pixel. Outputting the first noise information may further include outputting the first noise information of each of the first image and the second image with reference to the integrated noise vector for each pixel and the encoding vector for each pixel.

In an embodiment, outputting the first noise information may include performing a channel-wise summation of the integrated noise vector for each pixel and the encoding vector for each pixel to output the first noise information.

In an embodiment, the loss may include a first loss and a second loss. Updating the parameters may include generating a first denoised image and a second denoised image by using the first image, the second image, and the second noise information corresponding thereto, outputting the first loss with reference to the first denoised image and the second denoised image, determining a specific noise prototype vector that satisfies a preset similarity condition among the first noise prototype vector to the M-th noise prototype vector with reference to the vector similarity for each pixel, and outputting the second loss with reference to the encoding vector for each pixel and the specific noise prototype vector.

In an embodiment, the loss may further include a third loss, a fourth loss and a fifth loss. Updating the parameters may further include outputting the third loss with reference to the first denoised image and the second image or to the second denoised image and the first image, outputting the fourth loss with reference to a specific denoised image corresponding to a specific image among the first image and the second image, specific noise information corresponding to the specific image, and the specific image, and outputting the fifth loss with reference to the first noise prototype vector to the M-th noise prototype vector.

According to still another aspect of the present disclosure, an image noise extraction test method includes applying an encoding operation to a test image to output a test encoding feature map corresponding to the test image. The method also includes applying a noise prototype vector generation operation to the test encoding feature map to generate a first test noise prototype vector to an M-th test noise prototype vector corresponding to the test image. The method additionally includes outputting first test noise information corresponding to the test image with reference to at least a part of the first test noise prototype vector to the M-th test noise prototype vector and the test encoding feature map. The method further includes applying a decoding operation to the first test noise information to output second test noise information corresponding to the test image. The method further still includes outputting a test denoised image with reference to the test image and the second test noise information.

BRIEF DESCRIPTION OF THE DRAWINGS

The above and other objects, features and advantages of the present disclosure should be more apparent from the following detailed description taken in conjunction with the accompanying drawings, in which:

FIG. 1 is a block diagram illustrating a configuration of an apparatus for learning image noise extraction, according to an embodiment of the present disclosure.

DETAILED DESCRIPTION

Figure 2:
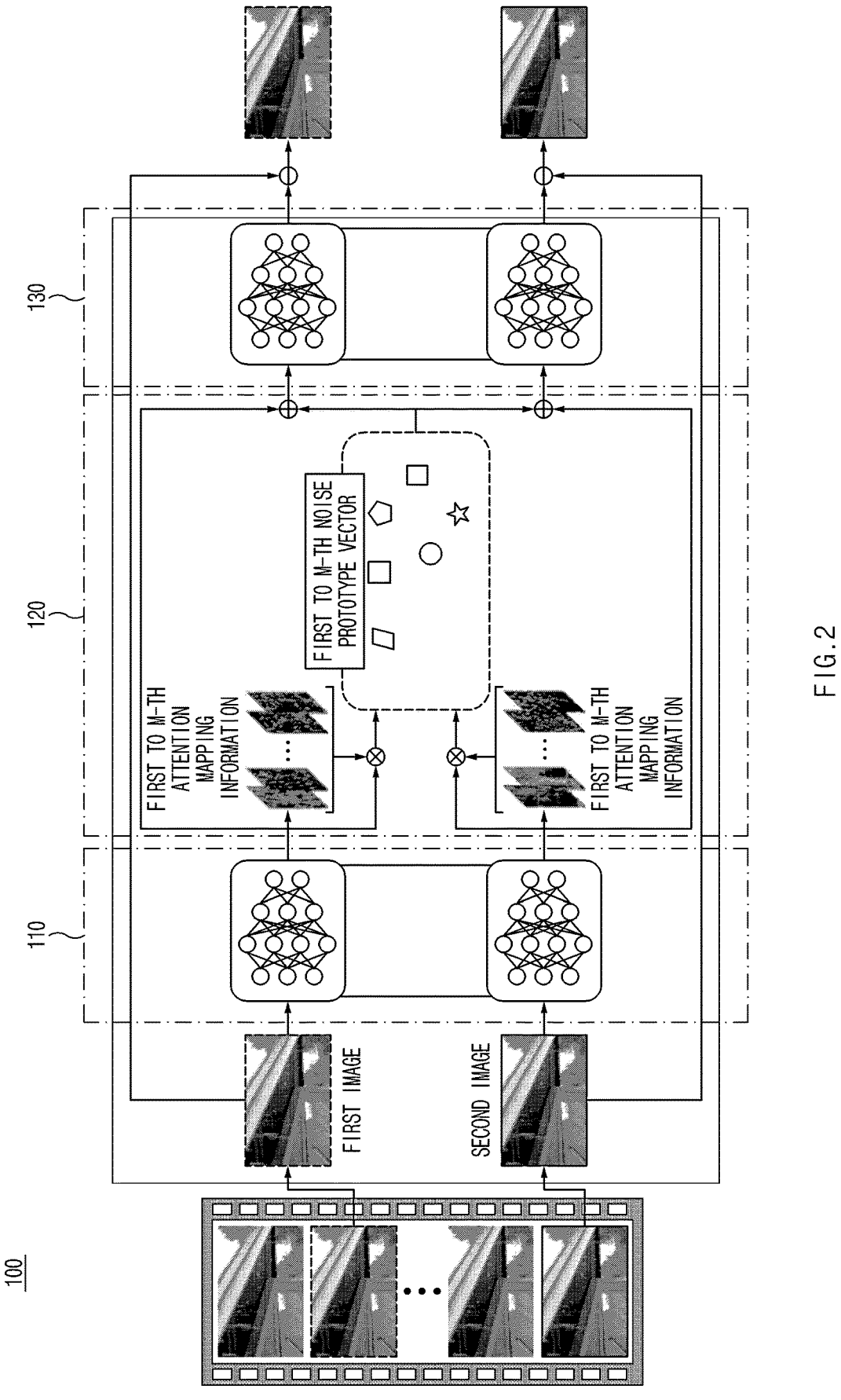
FIG. 2 is a block diagram illustrating an input/output of an apparatus for learning image noise extraction, according to an embodiment of the present disclosure.

Hereinafter, embodiments of the present disclosure are described in detail with reference to the accompanying drawings. In the accompanying drawings, the identical or equivalent components are designated by the identical reference numeral even when the components are displayed on different drawings. Further, in the following description, a detailed description of the related known configuration or function has been omitted when the subject matter of the present disclosure may be obscured thereby.

In describing the components of the embodiment according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one having ordinary skill in the art to which this disclosure pertains. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

The term "apparatus" used in this specification signifies one or more units that process at least one function or operation, and may be realized by hardware, software, or a combination thereof. The operations of the method or the functions described in connection with the forms disclosed herein may be embodied directly in a hardware or a software module executed by a processor, or in a combination thereof.

Hereinafter, embodiments of the present disclosure are described in detail with reference to FIGS. 1 to 5.

FIG. 1 is a block diagram illustrating a configuration of an apparatus 100 for learning image noise extraction, according to an embodiment of the present disclosure.

Referring to FIG. 1, the apparatus 100 may include an encoder 110, a noise information extraction layer 120, a decoder 130, and a parameter updater 140.

The encoder 110 may output an encoding feature map by applying an encoding operation to an input image.

The noise information extraction layer 120 may apply a noise information extraction operation to the encoding feature map output from the encoder 110 to output first noise information.

The decoder 130 may apply a decoding operation to the first noise information output from the noise information extraction layer 120 to output second noise information.

The parameter updater 140 may generate a loss with reference to an image and the second noise information and perform backpropagation using the loss to update at least some parameters of the encoder 110, the noise information extraction layer 120, and the decoder 130.

The configuration of the apparatus 100 for learning image noise extraction according to an embodiment of the present disclosure has been schematically described above, and the operation of the apparatus 100 for learning image noise extraction according to an embodiment of the present disclosure is described below in detail with reference to FIG. 2.

Referring to FIG. 2, a first image and a second image included in a time-series image (e.g., a time-lapse image) may be input to the apparatus 100 for learning image noise extraction. The first image and the second image may be images obtained by capturing the same subject (or background) at different capturing times.

For example, a time-series image may be an image obtained by capturing the same subject (or background) at the same location over time on a rainy day (noise). In such a time-series image, the location of the subject (or background) in the first image and the location of the subject (or background) in the second image may be the same/similar to each other, but the location and/or the amount of the rain streak in the first image may be different from those in the second image.

For reference, because the same/similar operations are performed on the first image and the second image, for convenience of explanation, when the encoder 110, the noise information extraction layer 120, and the decoder 130 are described below, operations performed on the first image are mainly described, and descriptions of operations performed on the second image are omitted.

The encoder 110 may apply an encoding operation to a first image (X) to output an encoding feature map (x) corresponding to the first image (X).

In an embodiment, the encoder 110 may include a convolution layer and a pooling layer (e.g., a max-pooling layer). The size of the kernel of the convolution layer may be 3*3, the size of the kernel of the pooling layer may be 2*2, and the size of the stride may be 2, for example.

Table 1 below illustrates an example structure of the encoder 110. It is noted, however, that the example structure is provided only for facilitating understanding, and embodiment of the present disclosure are not limited thereto.

TABLE 1

| Encoder | | | |
|---|---|---|---|
| Layer (Output) | C_in | C_out | Input |
| Conv_E1a | 3 | 64 | I |
| Conv_E1b | 64 | 64 | Conv_E1a |
| Pool_E1 | 64 | 64 | Conv_E1b |
| Conv_E2a | 64 | 64 | Pool_E1 |
| Conv_E2b | 64 | 64 | Conv_E2a |
| Pool_E2 | 64 | 64 | Conv_E2b |
| Conv_E3a | 64 | 64 | Pool_E2 |
| Conv_E3b | 64 | 64 | Conv_E3a |
| Pool_E3 | 64 | 64 | Conv_E3b |
| Conv_E4a | 64 | 64 | Pool_E3 |
| Conv_E4b | 64 | 64 | Conv_E4a |

The noise information extraction layer 120 may apply a noise prototype vector generation operation to the encoding feature map (x) corresponding to the first image (X) to generate a first noise prototype vector to an M-th noise prototype vector corresponding to the first image (X). The noise information extraction layer 120 may output the first noise information (x^+x) corresponding to the first image (X) with reference to at least a part of the first noise prototype vector to the M-th noise prototype vector and the encoding feature map.

For example, the noise information extraction layer 120 may apply a first attention mapping operation ($A_1$) to an M-th attention mapping operation ($A_M$) to the encoding feature map (x) corresponding to the first image (X) to generate first attention mapping information ($A_1(x)=w^1$) to M-th attention mapping information ($A_M(x)=w^M$) corresponding to the first image (X).

In an embodiment, the first attention mapping information to the M-th attention mapping information shown in FIG. 2 is not generated by the encoder 110, but is generated by the noise information extraction layer 120 applying the attention mapping operation to the encoding feature map output from the encoder 110.

In an embodiment, the above-described process may be performed for each pixel of the encoding feature map (x). For example, the noise information extraction layer 120 may apply the first attention mapping operation to the M-th attention mapping operation to encoding vectors ($x^1$ to $x^K$) for each pixel corresponding to a plurality of pixels (e.g., H*W=K pixels) of the encoding feature map (x) to generate the first noise attention mapping information ($w^{1,1}$ to $w^{K,1}$) for each pixel to the M-th noise attention mapping information ($w^{1,M}$ to $w^{K,M}$) for each pixel corresponding to each encoding vector for each pixel of the encoding feature map corresponding to the first image.

In an embodiment, the first to Mth attention mapping operations may classify types of rain streaks into M types and classify to which rain streak types a feature including an encoding feature map corresponds. A result of the attention mapping operation may be applied as a weight for an encoding vector for each pixel. The attention mapping operation may be an operation performed by a fully-connected (FC) layer, for example.

In an embodiment, the noise information extraction layer 120 may generate a first noise prototype vector ($p^1$) to an M-th noise prototype vector ($p^M$) of the first image with reference to the encoding feature map (x) and the first attention mapping information ($w^1$) to the M-th attention mapping information ($w^M$). The apparatus for learning image noise extraction according to an embodiment of the present disclosure may repeat the backpropagation process using a loss as described in detail below to perform learning such that the first noise prototype vector ($p^1$) to the M-th noise prototype vector ($p^M$) well reflect characteristics of noise for each type.

For example, according to Equation 1 below, the noise information extraction layer 120 may generate the first noise prototype vector ($p^1$) to the M-th noise prototype vector ($p^M$) of the first image with reference to the encoding vectors ($x^1$ to $x^K$) for each pixel and the first noise attention mapping information ($w^{1,1}$ to $w^{K,1}$) for each pixel to the M-th noise attention mapping information ($w^{1,m}$ to $w^{K,M}$) for each pixel.

$$p^m = \sum\nolimits_{k=1}^{K} \frac{w^{k,m}}{\sum_{k'=1}^{K} w^{k',m}} x^k \qquad \text{Equation 1}$$

In addition, the noise information extraction layer 120 may generate the integrated noise vector (x^) with reference to the first noise prototype vector ($p^1$) to the M-th noise prototype vector ($p^M$) and the vector similarities ($\alpha^1$ to $\alpha^M$) corresponding thereto. The vector similarities ($\alpha^1$ to $\alpha^M$) may correspond to similarities between each of the first noise prototype vector ($p^1$) to the M-th noise prototype vector ($p^M$) and the encoding feature map (x).

For example, according to Equation 2 below, the noise information extraction layer 120 may generate an integrated noise vector ($x^{^k}$) for each pixel with reference to the first noise prototype vector ($p^1$) to the M-th noise prototype vector ($p^M$) and the vector similarities ($\alpha^{k,1}$ to $\alpha^{k,M}$) for each pixel corresponding thereto.

$$\hat{x}^k = \sum\nolimits_{m=1}^{M} a^{k,m} p^m \qquad \text{Equation 2}$$

The vector similarities ($\alpha^{k,1}$ to $\alpha^{k,M}$) for each pixel may correspond to similarities between each of the first noise prototype vector ($p^1$) to the M-th noise prototype vector ($p^M$)

and the encoding vector $(x^k)$ for each pixel, and may be calculated according to following Equation 3.

$$a^{k,m} = \frac{x^k p^m}{\sum_{m'=1}^{M} x^k p^{m'}} \qquad \text{Equation 3}$$

The noise information extraction layer 120 may output first noise information $(x\hat{} + x)$ corresponding to the first image with reference to the integrated noise vector $(x\hat{})$ and the encoding feature map (x).

For example, the noise information extraction layer 120 may output the first noise information $(x\hat{} + x)$ corresponding to the first image with reference to the integrated noise vector $(x\hat{}k, \text{ i.e., } x\hat{}1 \text{ to } x\hat{}K)$ for each pixel and the encoding vector $(x^1 \text{ to } x^K)$ corresponding thereto.

In an embodiment, the noise information extraction layer 120 may perform channel-wise summation of the integrated noise vectors $(x\hat{}1 \text{ to } x\hat{}K)$ for each pixel and the encoding vectors $(x^1 \text{ to } x^K)$ for each pixel to output the first noise information $(x\hat{} + x)$.

The decoder 130 may apply a decoding operation to the first noise information $(x\hat{} + x)$ to output the second noise information $(R\hat{})$ corresponding to the first image.

As an example, the decoder 130 may include a 3*3 deconvolution layer, a convolution layer, and a rectified linear unit (ReLU). The deconvolution layer may be a transposed convolution, and an up-scaling coefficient may be 2, for example.

Table 2 below illustrates an example structure of the decoder 130. It is noted, however, that the example structure is provided only for facilitating understanding, and embodiments of the present disclosure are not limited thereto.

TABLE 2

| Decoder | | | |
|---|---|---|---|
| Layer (Output) | C_in | C_out | Input |
| Conv_D4a | 64 | 64 | Conv_E4a |
| Conv_D4b | 64 | 64 | Conv_D4a |
| Upconv_D3 | 64 | 64 | Conv_D4b |
| Conv_D3a | 128 | 64 | {Upconv_D3, Conv_E3b} |
| Conv_D3b | 64 | 64 | Conv_D3a |
| Upconv_D2 | 64 | 64 | Conv_D3b |
| Conv_D2a | 128 | 64 | {Upconv_D2, Conv_E2b} |
| Conv_D2b | 64 | 64 | Conv_D2a |
| Upconv_D1 | 64 | 64 | Conv_D2b |
| Conv_D1a | 128 | 64 | {Upconv_D1, Conv_E1b} |
| Conv_D1b | 64 | 64 | Conv_D1a |
| Output | 64 | 64 | Conv_D1b |

In an embodiment, as the above-described process is performed on the second image, the second noise information corresponding to the second image may be output, and redundant description has been omitted.

The parameter updater 140 may output a loss with reference to the first image, the second image, and the second noise information corresponding thereto, and update at least several parameters of the encoder 110, the noise information extraction layer 120 and the decoder 130 through back propagation using the loss.

The loss may include a first loss to a second loss.

For example, the parameter updater 140 may generate a first denoised image and a second denoised image by using the first image, the second image, and second noise information corresponding thereto. The first denoised image may be a result of a subtraction operation between the first image and the second noise information corresponding to the first image, and the second denoised image may be a result of a subtraction operation between the second image and the second noise information corresponding to the second image.

In addition, according to Equation 4 below, the parameter updater 140 may output a first loss $(L_b)$ with reference to the first denoised image $(Y\hat{}_{w,n})$ and the second denoised image $(Y\hat{}_{v,n})$.

$$L_b = \sum_{n \in N} \sum_{\{w,v\} \in T} \sum_i \|\hat{Y}_{w,n}(i) - \hat{Y}_{v,n}(i)\|_1 \qquad \text{Equation 4}$$

According to Equation 5 below, the parameter updater 140 may determine a specific noise prototype vector satisfying a preset similarity condition among the first noise prototype vector to the M-th noise prototype vector with reference to the vector similarity for each pixel. The parameter updater 140 may output a second loss $(L_{coh})$ with reference to the encoding vector for each pixel and the specific noise prototype vector. The value of $\lambda_a$ may be appropriately selected according to design.

$$L_{coh} = \frac{1}{K} \sum_{k=1}^{K} \|x^k - p^*\|_2 \qquad \text{Equation 5}$$

In Equation 5, p* may be a specific noise prototype vector that satisfies a preset similarity condition (e.g., the highest similarity value) among vector similarities between the first noise prototype vector $(p^1)$ to the M-th noise prototype vector $(p^M)$ and the encoding vector $(x^k)$ for each specific pixel.

The loss may further include a third loss, a fourth loss, and a fifth loss. For example, according to Equation 6 below, the parameter updater 140 may output a third loss $(L_c)$ with reference to the first denoised image $(Y\hat{}_{w,n})$ and the second image $(X_{v,n})$, or the second denoised image $(Y\hat{}_{v,n})$ and the first image $(X_{w,n})$.

$$L_c = \sum_{n \in N} \sum_{\{w,v\} \in T} \sum_i \|\hat{X}_{w,n}(i) - \hat{Y}_{v,n}(i)\|_1 \qquad \text{Equation 6}$$

In addition, according to Equation 7 below, the parameter updater 140 may output a fourth loss $(L_s)$ with reference a specific denoised image $(Y\hat{}_{w,n})$ corresponding to a specific image $(X_{w,n})$ among the first image and the second image, the specific noise information $(R\hat{}_{w,n})$ corresponding to the specific image $(X_{w,n})$, and the specific image $(X_{w,n})$.

$$L_s = \sum_{n \in N} \sum_{w \in T} \sum_i \|X_{w,n}(i) - (\hat{Y}_{w,n}(i) + \hat{R}_{v,n}(i))\|_1 \qquad \text{Equation 7}$$

Further, according to Equation 8 below, the parameter updater 140 may output a fifth loss $(L_{div})$ with reference to the first noise prototype vector to the m-th noise prototype vector. The value of $\delta$ may be appropriately selected according to design.

$$L_{div} = \frac{1}{M(M-1)} \sum_{m=1}^{M} \sum_{m'=1}^{M} \left[ -\|p^m - p^{m'}\|_2 + \delta \right] \qquad \text{Equation 8}$$

In an embodiment, the second loss ($L_{coh}$) and the fifth loss ($L_{div}$) described above may be expressed as one loss as $L_{fea}$ in Equation 9 below. The value of $\lambda_a$ may be appropriately selected according to design.

$$L_{fea} = L_{coh} + \lambda_a L_{div} \qquad \text{Equation 9}$$

Using the second loss ($L_{coh}$) of Equation 5 and Equation 9, noises having similar characteristics may be aggregated to be expressed by a specific noise prototype vector (cohesion). In addition, using the fifth loss ($L_{div}$) of Equations 8 and 9, noises having different characteristics may be divided into different noise prototype vectors (divergence).

The loss of Equations 4 to 9 may be expressed as following Equation 10.

$$L_{tot} = L_b + \lambda_c L_c + \lambda_s L_s + \lambda_f L_{fea} \qquad \text{Equation 10}$$

Figure 3:
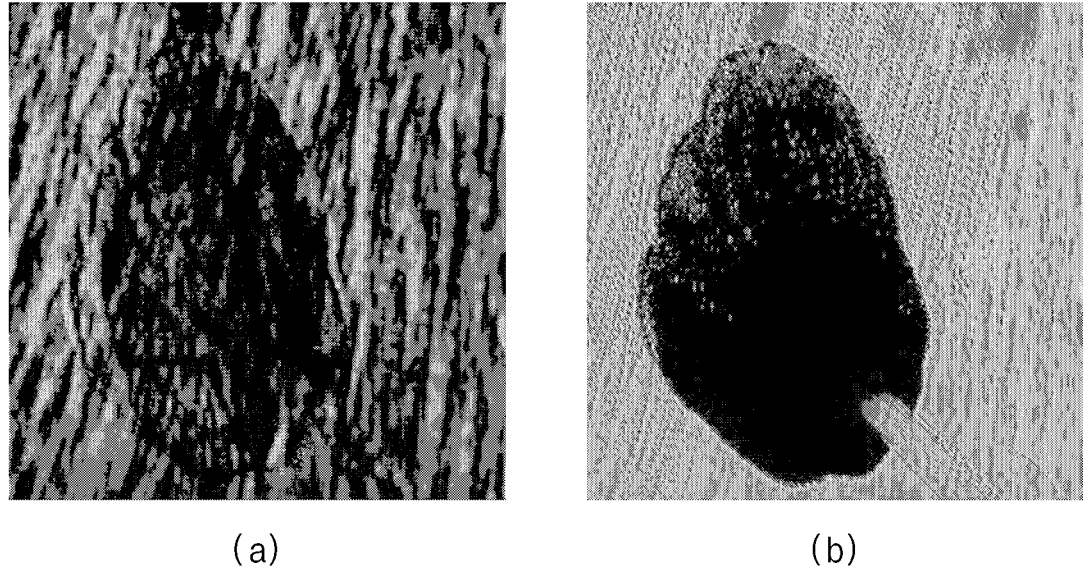
FIG. 3 is a diagram illustrating a comparison between noise information generated by a noise extraction apparatus according to the related art and noise information generated by an apparatus for learning noise extraction according to an embodiment of the present disclosure.

FIG. 3 illustrates diagrams providing a comparison between noise information generated by an apparatus according to the related art and an apparatus for learning noise extraction according to an embodiment of the present disclosure.

Referring to a diagram (a) of FIG. 3, in the case of a feature map output through an encoder and a decoder according to the related art, it may be understood that features related to rain streaks are expressed very roughly and inaccurately. On the other hand, referring to a diagram (b) of FIG. 3, in the case of a feature map output through the encoder 110, the noise information extraction layer 120, and the decoder 130 learned by the apparatus 100 for learning noise extraction according to an embodiment of the present disclosure, it may be understood that the features related to rain streaks are expressed very precisely and accurately compared to the related art.

Figure 4:
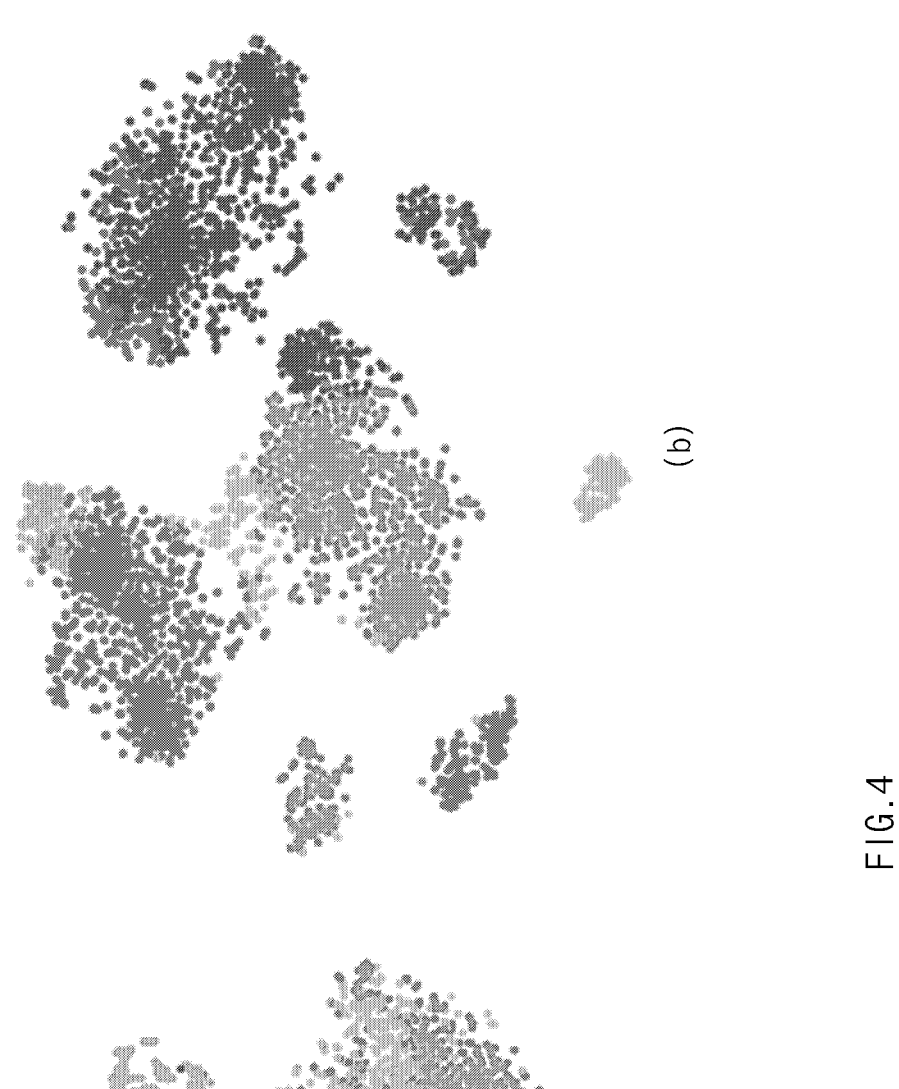
FIG. 4, view (a) and (b), is diagram illustrating feature distributions when a loss is not used and feature distribution when the loss is used, according to an embodiment of the present disclosure.

FIG. 4, view (a) and (b), is diagram illustrating (i) a feature distribution when the second loss (or the second loss and the fifth loss) is not used and (ii) feature distribution when the second loss (or the second loss and the fifth loss) is used in the case where the apparatus 100 updates at least some of the parameters of the encoder 110, the noise information extraction layer 120, and the decoder 130. For reference, the same/similar features are expressed in the same shade.

Referring to FIG. 4, view (a), when learning is performed without using the second loss (or the second loss and the fifth loss), it may be understood that some noises are mixed despite having different characteristics even when noises having different characteristics are separated and distributed.

On the other hand, referring to FIG. 4, view (b), when learning is performed using the second loss (or the second loss and the fifth loss), it can be seen that noises having different characteristics are more clearly separated and distributed as compared to the case illustrated in FIG. 4A.

As described above, the time-series images including the first image and the second image may be images of the same subject (or background) captured over time. In such time-series images, while the location of the subject (or background) in the first image and the location of the subject (or background) in the second image are the same/similar to each other, the location and/or density of noise (rain streak) in the first image and the location and/or density of the rain streak in the second image may be different from each other.

As described above, in an embodiment, at least some of the first loss to the fifth loss may be generated based on a common point (e.g., the location and shape of the background, or the like are the same) and differences (e.g., the location of the rain streak, the amount of the rain steak, or the like are different) between the two different images, and at least some of the parameters of the encoder 110, the noise information extraction layer 120, and the decoder 130 may be updated using the at least some of the first loss to the fifth loss. A case in which an embodiment of the present disclosure is applied to an actual test (e.g., rain streak removal) is described below.

In an actual test operation, because a process of additional learning using the parameter updater is not essential, a noise extraction test apparatus according to an embodiment of the present disclosure may include a learned encoder, a learned noise information extraction layer, a learned decoder, and an output device. In addition, in the actual test operation, because the process of learning by comparing a plurality of images is not essential, the noise extraction test apparatus according to an embodiment of the present disclosure may obtain a single test image and output a test denoised image corresponding thereto.

Figure 5:
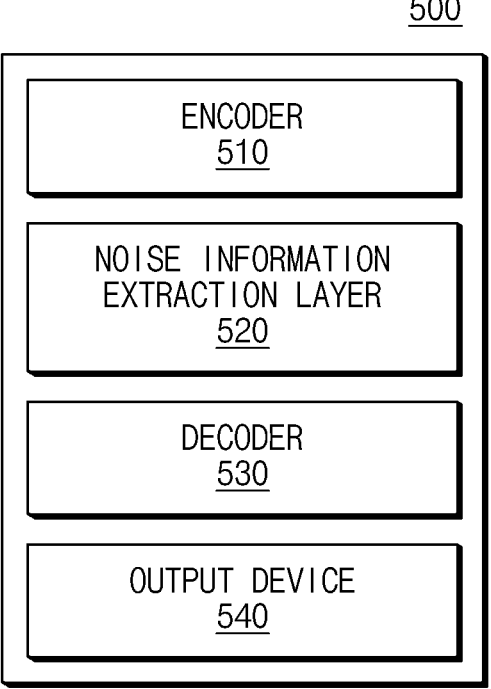
FIG. 5 is a block diagram illustrating a configuration of an image noise extraction test apparatus, according to an embodiment of the present disclosure.

FIG. 5 is a block diagram illustrating a configuration of an image noise extraction test apparatus 500, according to an embodiment of the present disclosure.

Referring to FIG. 5, the image noise extraction test apparatus 500 may include an encoder 510, a noise information extraction layer 520, a decoder 530, and an output device 540.

In an embodiment, the image noise extraction test apparatus 500 may output a test encoding feature map corresponding to a test image by applying an encoding operation to a test image using the encoder 510.

In addition, the image noise extraction test apparatus 500 may apply a noise prototype vector generation operation to the test encoding feature map using the noise information extraction layer 520 to generate a first test noise prototype vector to an M-th test noise prototype vector corresponding to the test image. The image noise extraction test apparatus 500 may output first test noise information corresponding to the test image with reference to at least a part of the first test noise prototype vector to the M-th test noise prototype vector, and the test encoding feature map.

The image noise extraction test apparatus 500 may apply a decoding operation to the first test noise information through the decoder 530 to output second test noise information corresponding to the test image.

The image noise extraction test apparatus 500 may output a test denoised image with reference to the test image and the second test noise information through the output device 540.

According to embodiments of the present disclosure, it is possible to analyze features of each pixel of a feature map to generate various types of noise information, thereby effectively extracting noise included in an image using the noise information.

In addition, according to embodiments of the present disclosure, it is possible to train a deep learning network through unsupervised learning, thereby effectively extracting noise included in an image.

In addition, various effects that are directly or indirectly understood through the present disclosure may be provided.

Although embodiments of the present disclosure have been described for illustrative purposes, those having ordinary skill in the art should appreciate that various modifications, additions, and substitutions are possible, without departing from the scope and spirit of the present disclosure.

Therefore, the embodiments described in the present disclosure are provided for the sake of descriptions, not limiting the technical concepts of the present disclosure. It should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for extracting noise from an image, the apparatus comprising:

an encoder configured to apply an encoding operation to a first image and a second image included in a time-series image to output an encoding feature map of each of the first image and the second image;

a noise information extraction layer configured to apply a noise prototype vector generation operation to the encoding feature map to generate a first noise prototype vector to an M-th noise prototype vector of each of the first image and the second image, and output first noise information of each of the first image and the second image with reference to at least a part of the first noise prototype vector to the M-th noise prototype vector and the encoding feature map;

a decoder configured to apply a decoding operation to the first noise information to output second noise information of each of the first image and the second image; and a processor, wherein the processor is configured to:

output a loss with reference to the first image, the second image, and the corresponding second noise information, and update parameters of at least some of the encoder, the noise information extraction layer and the decoder through back propagation using the loss, wherein the loss includes a first loss and a second loss;

generate a first denoised image and a second denoised image by using the first image, the second image, and the second noise information corresponding thereto;

output the first loss with reference to the first denoised image and the second denoised image;

determine a specific noise prototype vector that satisfies a preset similarity condition among the first noise prototype vector to the M-th noise prototype vector with reference to the vector similarity for each pixel; and output the second loss with reference to an encoding vector for each pixel and the specific noise prototype vector, wherein the noise information extraction layer is configured to:

apply a first attention mapping operation to an M-th attention mapping operation to the encoding feature map to generate first attention mapping information to M-th attention mapping information of each of the first image and the second image;

generate the first noise prototype vector to the M-th noise prototype vector of each of the first image and the second image with reference to the encoding feature map and the first attention mapping information to the M-th attention mapping information;

generate an integrated noise vector with reference to the first noise prototype vector to the M-th noise prototype vector and vector similarities corresponding thereto, wherein the vector similarity corresponds to a similarity between each of the first noise prototype vector to the M-th noise prototype vector and the encoding feature map;

output the first noise information of each of the first image and the second image with reference to the encoding feature map and the integrated noise vector;

apply the first attention mapping operation to the M-th attention mapping operation to the encoding vector for each pixel corresponding to a plurality of pixels of the encoding feature map to generate first noise attention mapping information to an M-th noise attention mapping information for each pixel corresponding to each encoding vector for each pixel of the first image and the second image;

generate the first noise prototype vector to the M-th noise prototype vector of each of the first image and the second image with reference to the encoding vector for each pixel and the first noise attention mapping information for each pixel to the M-th noise attention mapping information for each pixel;

generate an integrated noise vector for each pixel with reference to the first noise prototype vector to the M-th noise prototype vector and the vector similarity for each pixel corresponding thereto, wherein the vector similarity for each pixel corresponds to a similarity between each of the first noise prototype vector to the M-th noise prototype vector and the encoding vector for each pixel; and output the first noise information of each of the first image and the second image with reference to the integrated noise vector for each pixel and the encoding vector for each pixel.

2. The apparatus of claim 1, wherein the noise information extraction layer is configured to:

perform a channel-wise summation of the integrated noise vector for each pixel and the encoding vector for each pixel to output the first noise information.

3. The apparatus of claim 1, wherein:

the loss further includes a third loss, a fourth loss, and a fifth loss, and the processor is further configured to:

output the third loss with reference to the first denoised image and the second image or to the second denoised image and the first image, output the fourth loss with reference to a specific denoised image corresponding to a specific image among the first image and the second image, specific noise information corresponding to the specific image, and the specific image, and output the fifth loss with reference to the first noise prototype vector to the M-th noise prototype vector.

4. A method of learning image noise extraction, comprising:

outputting an encoding feature map of each of a first image and a second image by applying an encoding operation to a first image and a second image included in a time-series image;

applying a noise prototype vector generation operation to the encoding feature map to generate a first noise prototype vector to an M-th noise prototype vector of each of the first image and the second image;

outputting first noise information of each of the first image and the second image with reference to at least a part of the first noise prototype vector to the M-th noise prototype vector and the encoding feature map;

outputting second noise information of each of the first image and the second image by applying a decoding operation to the first noise information;

outputting a loss with reference to the first image, the second image, and the corresponding second noise information; and updating parameters of at least some of an encoder, a noise information extraction layer and a decoder through back propagation using the loss, wherein the loss includes a first loss and a second loss, wherein updating the parameters includes:

generating a first denoised image and a second denoised image by using the first image, the second image, and the second noise information corresponding thereto, outputting the first loss with reference to the first denoised image and the second denoised image, determining a specific noise prototype vector that satisfies a preset similarity condition among the first noise prototype vector to the M-th noise prototype vector with reference to the vector similarity for each pixel, and outputting the second loss with reference to an encoding vector for each pixel and the specific noise prototype vector, and wherein outputting the first noise information includes:

applying a first attention mapping operation to an M-th attention mapping operation to the encoding feature map to generate first attention mapping information to M-th attention mapping information of each of the first image and the second image, generating the first noise prototype vector to the M-th noise prototype vector of each of the first image and the second image with reference to the encoding feature map and the first attention mapping information to the M-th attention mapping information, generating an integrated noise vector with reference to the first noise prototype vector to the M-th noise prototype vector and vector similarities corresponding thereto, wherein the vector similarity corresponds to a similarity between each of the first noise prototype vector to the M-th noise prototype vector and the encoding feature map, outputting the first noise information of each of the first image and the second image with reference to the encoding feature map and the integrated noise vector, applying the first attention mapping operation to the M-th attention mapping operation to the encoding vector for each pixel corresponding to a plurality of pixels of the encoding feature map to generate first noise attention mapping information to an M-th noise attention mapping information for each pixel corresponding to each encoding vector for each pixel of the first image and the second image, generating the first noise prototype vector to the M-th noise prototype vector of each of the first image and the second image with reference to the encoding vector for each pixel and the first noise attention mapping information for each pixel to the M-th noise attention mapping information for each pixel, generating an integrated noise vector for each pixel with reference to the first noise prototype vector to the M-th noise prototype vector and the vector similarity for each pixel corresponding thereto, wherein the vector similarity for each pixel corresponds to a similarity between each of the first noise prototype vector to the M-th noise prototype vector and the encoding vector for each pixel, and outputting the first noise information of each of the first image and the second image with reference to the integrated noise vector for each pixel and the encoding vector for each pixel.

5. The method of claim 4, wherein outputting the first noise information includes:

performing a channel-wise summation of the integrated noise vector for each pixel and the encoding vector for each pixel to output the first noise information.

6. The method of claim 4, wherein:

the loss further includes a third loss, a fourth loss, and a fifth loss, and updating the parameters further includes:

outputting the third loss with reference to the first denoised image and the second image or to the second denoised image and the first image, outputting the fourth loss with reference to a specific denoised image corresponding to a specific image among the first image and the second image, specific noise information corresponding to the specific image, and the specific image, and outputting the fifth loss with reference to the first noise prototype vector to the M-th noise prototype vector.

* * * * *